United States Patent
Yamashita (10) Patent No.: US 9,452,886 B2
(45) Date of Patent: Sep. 27, 2016

(54) METHOD FOR PROVIDING TRANSPORT UNITS FROM A STORAGE FACILITY

(71) Applicant: Shin Yamashita, Obertshausen (DE)

(72) Inventor: Shin Yamashita, Obertshausen (DE)

(73) Assignee: DEMATIC SYSTEMS GMBH, Heusenstamm (DE)

( * ) Notice: Subject to any disclaimer, the term of this patent is extended or adjusted under 35 U.S.C. 154(b) by 92 days.

(21) Appl. No.: 14/342,468

(22) PCT Filed: Jul. 17, 2013

(86) PCT No.: PCT/EP2013/065061
§ 371 (c)(1),
(2) Date: Mar. 3, 2014

(87) PCT Pub. No.: WO2014/023539
PCT Pub. Date: Feb. 13, 2014

(65) Prior Publication Data
US 2014/0205423 A1 Jul. 24, 2014

(30) Foreign Application Priority Data

Aug. 6, 2012 (DE) .................. 10 2012 107 176

(51) Int. Cl.
*B65G 1/00* (2006.01)
*B65G 1/137* (2006.01)
*B65G 1/04* (2006.01)

(52) U.S. Cl.
CPC ........... *B65G 1/1378* (2013.01); *B65G 1/0407* (2013.01)

(58) Field of Classification Search
CPC  B65G 1/0485; B65G 1/4092; B65G 1/0414; B65G 1/0435
USPC ....................................... 414/273, 277, 280
See application file for complete search history.

(56) References Cited

U.S. PATENT DOCUMENTS

| 4,773,807 A | 9/1988 | Kroll et al. |
| 6,602,037 B2 * | 8/2003 | Winkler ................. B65G 1/023 414/273 |

(Continued)

FOREIGN PATENT DOCUMENTS

| DE | 29912230 U1 | 12/1999 |
| DE | 102006008932 A1 | 8/2007 |

(Continued)

OTHER PUBLICATIONS

Machine translation of FR2115486 from Espacenet, generated on Mar. 30, 2016.*

(Continued)

*Primary Examiner* — Michael McCullough
*Assistant Examiner* — Mark Hageman
(74) *Attorney, Agent, or Firm* — Gardner, Linn, Burkhart & Flory, LLP (57) ABSTRACT

Method for providing transport units from a storage facility on at least one removal line, wherein the transport units are stored in a plurality of storage racks and storage rack levels, wherein interior storage racks are arranged in pairs adjoining one another and have a storage aisle on each side of the pair. At least one storage line and at least one removal line is provided. The transport units are placed into storage in, and removed from storage from, the storage rack via a storage and removal apparatus for each access aisle. For each access aisle, a storage and removal apparatus is provided. At least one removal lift is used to transfer the transport units to the removal line connected downstream thereof. A direct exchange of transport units takes place between two adjoining storage racks from one access aisle to an adjacent access aisle via transverse conveyance locations in the storage racks. The storage and removal apparatus moves the transport units in the transverse conveyance locations.

29 Claims, 7 Drawing Sheets

(56) References Cited

U.S. PATENT DOCUMENTS

| | | | | |
|---|---|---|---|---|
| 2005/0008463 | A1* | 1/2005 | Stehr | B65G 1/1378 414/277 |
| 2006/0245858 | A1* | 11/2006 | Suess | B65G 1/0435 414/277 |
| 2009/0162173 | A1* | 6/2009 | Garbers | B65G 1/0485 414/331.14 |
| 2011/0008137 | A1 | 1/2011 | Yamashita | |
| 2011/0008138 | A1 | 1/2011 | Yamashita | |
| 2012/0099953 | A1 | 4/2012 | Hortig et al. | |
| 2012/0328397 | A1 | 12/2012 | Yamashita | |
| 2013/0333987 | A1 | 12/2013 | Hortig et al. | |

FOREIGN PATENT DOCUMENTS

| | | |
|---|---|---|
| DE | 102006025620 A1 | 11/2007 |
| EP | 1234785 A1 | 8/2002 |
| EP | 1254852 A1 | 11/2002 |
| EP | 1486435 A1 | 12/2004 |
| EP | 1813556 A1 | 8/2007 |
| EP | 1964792 B1 | 4/2012 |
| FR | 2115486 * 7/1972 | ............... B65G 1/00 |
| WO | 2011006601 A1 | 1/2011 |

OTHER PUBLICATIONS

International Search Report and Written Opinion of the International Searching Authority from corresponding Patent Cooperation Treaty (PCT) Application No. PCT/EP2013/065061, mailed Nov. 11, 2013.

English Translation of International Preliminary Report on Patentability from corresponding Patent Cooperation Treaty Patent Application No. PCT/EP2013/065061 issued Feb. 10, 2015.

* cited by examiner

Fig. 6

METHOD FOR PROVIDING TRANSPORT UNITS FROM A STORAGE FACILITY

CROSS REFERENCE TO RELATED APPLICATION

The present application claims the priority benefits of International Patent Application No. PCT/EP2013, filed on Jul. 17, 2013, which is hereby incorporated herein by reference in its entirety.

BACKGROUND OF THE INVENTION

The invention relates to a method for providing transport units from a storage facility on at least one removal line.

When picking or compiling orders from ready-picked transport units, such as articles or containers, it is necessary to provide the transport units, which are associated with a common order, in a sequenced or sorted manner. For this purpose, it is typical to temporarily store (buffer) the transport units of one order until all of the transport units required for the order are present. They are then passed collectively onto a collecting line, which guides them to the palletization area, picking station, goods issuing department, dispatch, or the like.

A high rack storage facility includes a feeding or storage-entry area, via which the goods are delivered and from which the racking serving units collect the goods for entry into storage, the so-called pre-zone. Similarly, a removal-from-storage area is required, at which after removal from storage the racking serving units place down the goods also assigned to the pre-zone. In the case of automatic picking warehouses, picking points are typically arranged in the pre-zone. The pre-zone is also where the goods are identified for the inventory management system or the material flow computer.

The applicant's EP 1 964 792 B1 discloses a method for providing transport units from a storage facility in a desired sequence on at least one collecting line. Racking serving units in each storage-racking aisle, removal lifts and removal-feeding lines are controlled so as to be coordinated with one another and are loaded with goods such that they ultimately end up sorted on the collecting line or are delivered thereby. The control and coordination is therefore relatively complex and requires technical outlay in the so-called pre-zone outside the actual racking.

SUMMARY OF THE INVENTION

The present invention provides a method and a storage system that provides sorted removal-from-storage in a more convenient manner and with reduced technical outlay while at the same time dispensing with sorting outside of the aisles.

A method for providing transport units from a storage facility, wherein the storage facility includes a plurality of storage racks each having multiple storage rack levels, wherein interior storage racks are arranged in pairs adjoining one another and have an access aisle on at least one side of each pair and at least one storage line and at least one removal line and a storage-entry and removal vehicle for each access aisle and at least one removal lift that is used to transfer the transport units to the removal line connected downstream of the lift, according to an aspect of the invention, includes directly exchanging transport units between two adjoining storage racks, from one access aisle to an adjacent storage aisle via transverse conveyance locations in the storage racks, wherein the storage and removal vehicle moves the transport units in the transverse conveyance locations.

A direct exchange of transport units takes place between two adjoining storage racks from one access aisle to an adjacent access aisle via transverse conveyance locations in the storage racks. This dispenses with the distribution and/or complex sorting in a pre-zone, since the transport units are already sorted when removed from storage, even if initially they were not arranged in a common racking aisle. Therefore, by dispensing with the distribution and sorting outside of the aisles, it is possible to achieve a direct transfer of the transport units without conveyors crossing one another, and this can be achieved with reduced and simplified technical outlay as well as with a smaller space requirement and a high level of reliability. The transport units can thus be simply removed from storage from the respective aisle in the required sequence.

The storage and vehicle apparatus may serve to move the transport units in the transverse conveyance locations. Therefore, there is no further drive technology needed in the rack and the storage and removal vehicle itself is the only active mechanism involved in the transverse displacement. In particular, the storage and removal vehicle places the transport units from the access aisle directly into the transverse conveyance locations of the target aisle by double or more storage depth. This means that the entry and removal vehicle of the adjacent target aisle simply needs to access the transport unit. This provides a fully automated storage facility. In other words, racking storage locations of abutting racks are used for passing transport units from one side of the rack to the next, so that the transport units can be transferred from one rack to the next. Therefore, transverse conveyance or sorting are possible within the racks themselves and "transverse conveyance" in the pre-zone can be dispensed with accordingly. Transverse conveyance locations may be provided on each level of the storage racks or on selected levels. Displacement-time optimization may be achieved if the transverse conveyance locations are arranged centrally or more closely to the removal lift or the entry lift in the longitudinal direction of the rack. It is likewise possible to provide a plurality of transverse conveyance locations on the respective level and optionally at different positions.

The transverse conveyance locations can also be used as temporary storage areas or intermediate conveying positions, whereby the transport units remain until they are actually required or removed from storage. This is particularly expedient if the transverse conveyance locations are associated with the final target aisle of the transport unit. The exchange can be effected actively or passively with regard to the storage or removal apparatus. On the one hand, the transverse conveyance location can simply be a passive storing location, in which the storage and removal vehicle of one aisle stores transport units and places them into storage and from which the storage and removal vehicle of the adjacent aisle receives transport units and removes them from storage. This procedure can be performed for each racking storage location or transverse conveyance location only in one direction [unidirectionally] or in both directions [bi-directionally].

It is possible to equip the transverse conveyance location with corresponding materials-handling technology, such as driven rollers, loose roller conveyor optionally inclined, conveyor belts with or without a drive, etc. Then, the storage and removal apparatus can store the transport units and the materials-handling technology of the transverse conveyance location performs the transportation. Accordingly, the transverse conveyance locations can be configured as conventional storage locations, live storage racks inclined or not inclined, with or without an active or passive drive, as roller conveyors, belt conveyors, etc. The transverse conveyance locations can also utilize a pushing mechanism for the transport units.

The simplicity of the transverse conveyance locations also permits subsequent retrofitting and conversion of transverse conveyance locations and flexible adaptation to the required capacity of the storage system. The transverse conveyance locations can thus optionally be configured for bidirectional or unidirectional exchange and/or for active or passive exchange. The storage and removal vehicles can likewise place the transport units into storage at double depth or multiple depths in the transverse conveyance locations for exchange purposes. The storage and removal apparatuses of one aisle can thus place into storage the transport units in the transverse conveyance locations at such a depth that they are already to be assigned to the adjacent rack and can be reached "normally" by the corresponding storage and removal vehicle of the adjacent rack. For this purpose, the load handling device of the storage and removal vehicle may have telescopic rail arms that can have an extended reach. It is likewise feasible for the transport units to be stored in a stacked manner.

Since the transverse conveyance locations are subject to very considerable loads, it is expedient if the transverse conveyance locations have a friction-reducing surface and/or structural reinforcement. Therefore, damage to the transport units may also be reduced or even completely prevented.

The storage and removal vehicle may be racking serving units that service multiple levels of a rack or single-level racking serving units. Satellite vehicles or shuttles are particularly suitable. It is also possible to use those vehicles that have a lifting platform or a plurality of load lifting platforms that are arranged one above the other for serving a plurality of levels from one travel rail set. Therefore, it is possible to achieve a particularly high level of removal efficiency while completely maintaining the desired sequence of the transport units in each aisle. This is also achieved with considerably less technical outlay compared with the prior art.

It is understood that where the term "transport units" is used, this is not to be interpreted as limiting, but other types of transport (e.g., trays, pallets, etc.) can also be used to like effect within the scope of the invention. The term "transport units" also includes combined individual articles in particular trays, containers, cartons, packing units and individual articles. These transport units can be either source units, from which a picker takes articles of an order so that they function as source or donor (frequently also called product units), or these units can be order units for collecting/compiling articles of an order. For ease of understanding, only the term "transport units" will be used where possible hereinafter. The transport units can be placed into storage randomly ("chaotically") so as to be distributed over the entire system without knowledge of the subsequent sequence. In contrast to DE 299 12 230 U1, there is no requirement for a limitation to possible modules or storage areas.

Transport carriages with extendable arms may be used in particular as the single level racking serving unit or carriage. They are described inter alia in EP 1 254 852 A1. The storage warehouse may be a system, which can be used universally, is constructed in modular fashion and combines storage and transport in one integrated concept. Such storage warehouse complements the domain of the automatic small-parts warehouse as a highly efficient, cost-effective and innovative solution. The transport carriage is a rail-bound vehicle, which operates in the rack and serves the entire storage facility system. The system concept may use autonomous, rail-guided vehicles for container transport, which operate inside and outside the storage facility system. A specific load picking-up technique permits short load cycle times as well as simultaneous loading and unloading. The system has travel rails, which are installed on each level of the storage facility or are installed so as to be elevated or suspended in the pre-zone. They not only guide the vehicles but also supply voltage thereto.

The storage and retrieval vehicles can be used in two variants, a so-called "captive" or "roaming" arrangement. In the captive arrangement, the vehicles remain on their respective level. In the roaming arrangement, they change levels according to requirement. Vertical conveyors can be used in particular as the removal lift. It is favorable if each removal lift has one or a plurality of, in particular two, locations.

Each storage racking level may have at least one buffer location for decoupling the single level racking serving unit and the removal lift. This renders it possible to fully utilize the faster single level racking serving units and to minimize the lift from running empty. Each removal lift may be connected to a plurality of removal lines. This improves sorting options and increases the number of orders that can be processed in parallel or increases the number of stations that can be supplied. In the simplest case, the removal feeding lines are designed as store delay feeding lines or conveyors. They can be provided with delay mechanisms, such as a displaceable stop element.

Each removal lift may have, for each location, a separately driven conveyor. Each removal lift may have two locations that are each provided with a separately driven conveyor, which conveyors are displaceable in different directions. Therefore, the transfer of two transport units for each level (e.g., in the case of the above-referenced arrangement) can always be effected simultaneously in different directions or onto different removal buffers, e.g., to the left and right. To this end, the reception of the transport units onto the lift may be controlled in such a manner that the two transport units are to be delivered to one level. This is possible on account of the high level of efficiency of the transport carriages which are used, as the transfer locations (buffer location) with respect to the removal lift are practically always occupied, which means that for the purpose of controlling the removal lift a selection option is provided which allows the lift to be occupied accordingly by transport units for different removal buffers of one level.

The system is also characterized by a high level of flexibility, since the storage and removal lines can be connected at random points to the corresponding lifts. In a similar manner to the removal lifts, dedicated storage lifts corresponding to the removal lifts can likewise be provided with correspondingly feeding distribution feeding lines. On the other hand, it is also possible to control the removal lifts in such a manner that they can be used not only for the removal work but also as storage lifts. Conversely, optionally present dedicated storage lifts can also be used as removal lifts according to requirement. This also enables interruption-free operation or an increase in system performance even when individual lifts malfunction. For this purpose, the storage or removal lines between the lift and the rack may be arranged at different heights. This uses two similar combined storage and removal levels, whose collecting lines are combined after passing through the last removal line in sequence.

The function of transverse displacement offers the advantage that in the event of a failure of a removal lift or feeding lines, it is possible to maintain the function of the aisle that is affected.

Four basic goods-to-person (GTP) order processing strategies and consolidation strategies of full source units in the automated storage facility may be used based upon the number of aisles, picking stations, lifts, order utilization and distribution and order and storage details (profiles), etc., when used in a GTP application as follows:

only relevant source transport units are transferred to a specific aisle by means of the transverse conveyance locations, wherein the aisle is selected based upon minimization of the movement in the transverse conveyance locations between aisles and order utilization and distribution. In other words, for picking purposes, the aisle selected is the one which permits minimization of the movement of the product units for order processing or consolidation of full source units and orders can be completed at a single picking station.

only order transport units are transferred in the storage facility by the transverse conveyance locations. In other words, picking is performed at each relevant aisle in which a relevant product unit is stored and the order units "travel" via a plurality of aisles to a plurality of picking stations until the order is fulfilled.

order units as well as product units are transferred in the automated storage facility by the transverse conveyance locations. In other words, picking is performed at a small number of selected aisles, at which relevant product units for an order are consolidated by the transverse conveyance locations and the order units "travel" in the same manner via a plurality of aisles to selected picking stations until the order is fulfilled. Consolidation of the order units and product units is based upon optimization of the order utilization and distribution and optimum use of such mobile resources, such as racking serving units, lifts, and the like.

incoming source units or full source units are placed into storage in the automated storage facility directly into the particular aisle or nearest possible aisle which will be used or most likely be used for order processing, based upon the information available at the time of storage-entry, taking into account a minimization of the transverse displacement in the transverse conveyance locations. This information includes but is not limited to:

instantaneous product distribution or deviations of each product in the storage facility;

orders which are already associated with individual aisles;

orders awaiting processing;

summary of families or product categories

These and other objects, advantages and features of this invention will become apparent upon review of the following specification in conjunction with the drawings.

BRIEF DESCRIPTION OF THE DRAWINGS

Further features and details of the invention will be apparent from the description hereinafter of the drawing, in which.

DESCRIPTION OF THE PREFERRED EMBODIMENT

The figures illustrate a storage facility, which is designated in its entirety by the reference numeral 1 and has a plurality of storage racking or access aisles 2 and storage racks R having a plurality of levels 3.

The storage racks R are arranged in such a manner that the interior storage racks R that are not arranged on the outside of the storage facility are each arranged in pairs adjoining one another and have a storage access aisle 2 on one side. The storage racks R located on the inside in each case thus abut one another with their "backs," namely, the side away from the access aisle.

On the end side, a lift 8 having two locations in each case is provided for each storage-access aisle 2. At the lowermost level, the lift 8 is adjoined by a storage-entry feeding or storage line 4 and a removal feeding or removal line 6. Arranged between the lift 8 and the storage rack R on each level 3 are corresponding storage-entry and removal buffer lines 7 and 9 in order to decouple the lift 8 from the storage and removal apparatus, or satellite vehicles 5 (also referred to as carriages) travelling in the storage racking aisle 2. It is understood that the storage feeding lines 4 and removal feeding lines 6 are connected to suitable conveying lines (not shown) for picking locations.

The shuttles 5 are provided in each storage access aisle 2 and on each level 3 at that location. This is a so-called "captive" variant, in which the shuttles 5 are fixedly allocated to one level 3 and do not change levels or aisles, which would theoretically be possible. The shuttles 5 include a transport platform 10 for receiving the respective transport unit T (carton, tray, container, individual articles). Arranged at the side of the transport platform 10 are in each case telescopic arms 11, which push the transport unit T off the platform 10 or pull it up onto the platform. For this purpose, the telescopic arms 11 can be extended on both sides of the storage racking aisle 2 into the racks R and have carriers or fingers 12 which can move in a known manner. Telescoping arms 11 are cable of storing and retrieving transport units to two or more rows of transport units and therefore have the capability referred to as double deep or multiple deep storage.

The storage racks R are provided on each level 3 with specific exchange locations Q for transversely conveying transport units T from one rack R to the adjacent rack R, so that the transport units T are exchanged within the storage racks R themselves and corresponding outlay in the pre-zone can be avoided. The shuttles 5 or the telescopic arms 11 thereof can therefore place transport units T in the transverse conveyance locations Q and push them into the corresponding location in the adjacent rack R. To this end, the respective transport unit T is pushed by being acted upon by means of the carriers 12 of the telescopic arms 11 beyond the rear storing location 13 of one transverse conveyance location Q of the first rack R into the respective rear storing location 13 of the adjacent transverse conveyance location Q of the adjacent rack R.

Furthermore, the storage racks R include a transverse conveyance location Q2. In contrast to the transverse conveyance locations Q, the transverse conveyance location Q2 is bidirectional, which means that an exchange can take place from the two racks R to the respectively adjacent rack R and the direction is determined by the initial position of the transport unit. A plurality of "normal" transverse conveyance locations Q are provided in each case (in this case two for each rack R) so that they do not have to be emptied immediately but rather—depending upon the configuration of the order to be removed from storage—can be used as a temporary storage area, from which an order of transport units T is directly removed from storage. Therefore, operation of the shuttles of adjacent racking aisles can be decoupled.

For the purposes of removal from storage, the transport units T are removed by the shuttles 5 from the storage rack R and are delivered to the removal buffer 9 which conveys the transport units T onwards to the lift 8 and thus to the removal feeding line 6. Conversely, storage-entry is effected via the storage-entry feeding lines 4, the lift 8 and the storage-entry buffer 7 and the shuttle 5 into the respective storage rack R. It is understood that storage entry and removal from storage can also be decoupled and can take place at different points on the storage rack R, e.g., at different end sides or even integrated laterally in the storage rack R.

In relation to FIGS. 4-7, four principles of operation will be described hereinafter by reference to the above storage facility.

Figure 1:
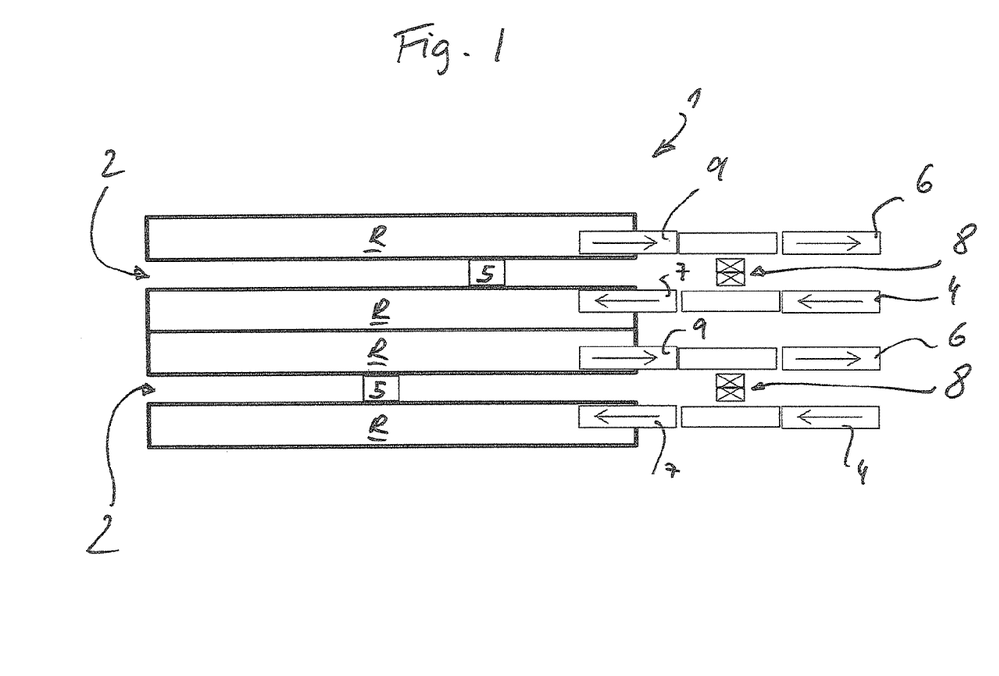
FIG. 1 shows a schematic view of a storage facility from above.
Figure 2:
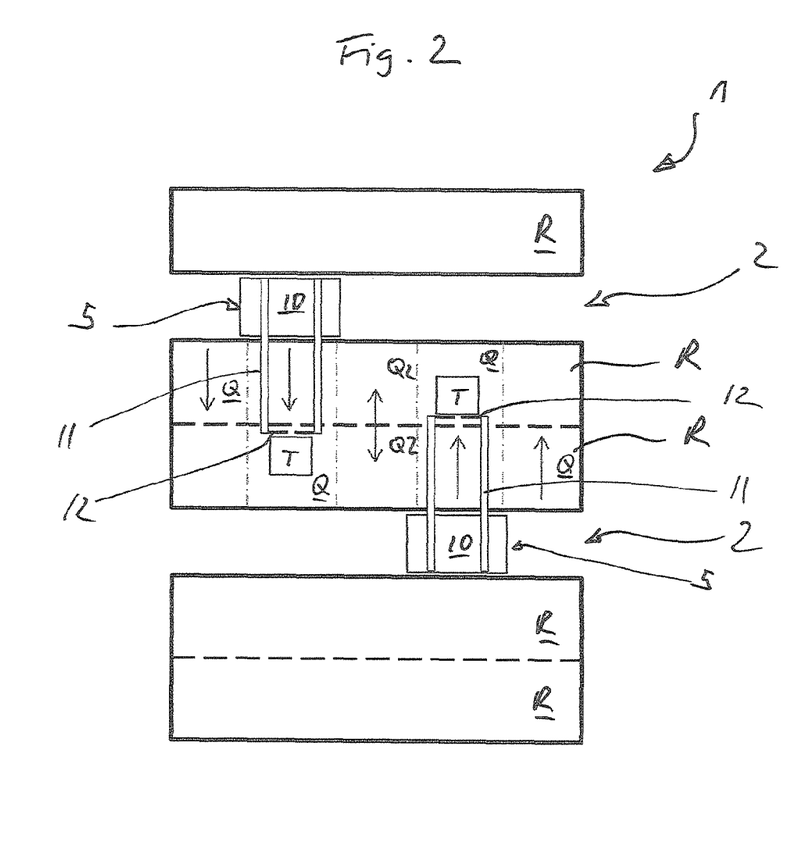
FIG. 2 shows an enlarged section of the facility in FIG. 1.
Figure 3:
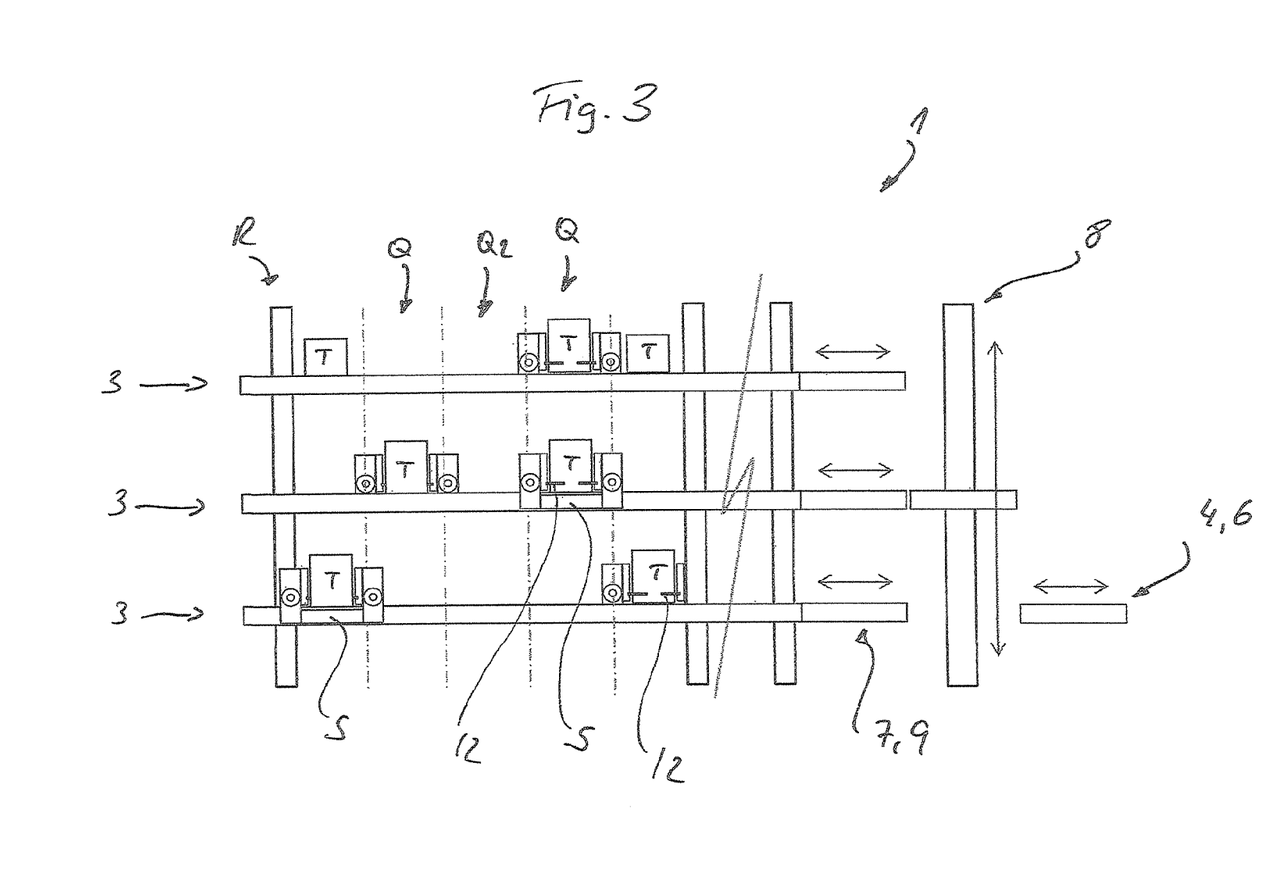
FIG. 3 shows a lateral view of the facility FIG. 1.
Figure 4:
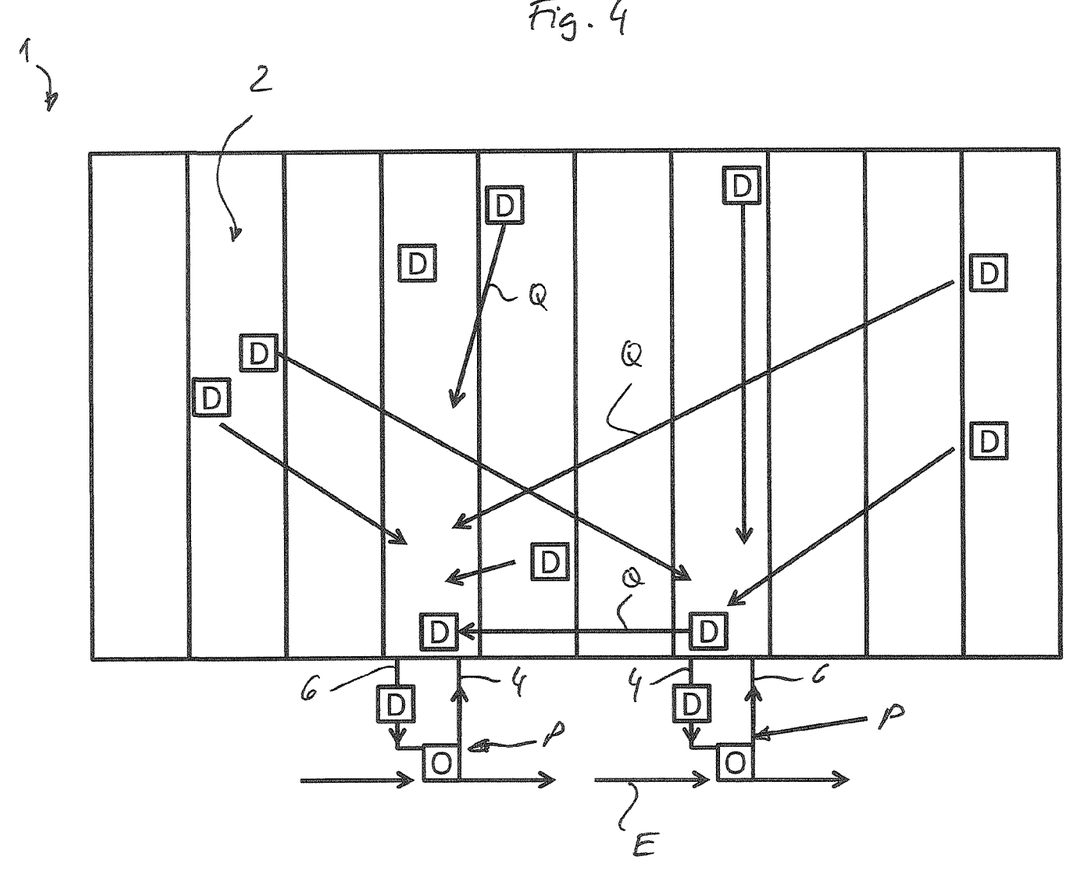
FIG. 4 shows a simplified and schematic view of the storage facility of FIG. 1 that is operated in accordance with a first principle.

In FIG. 4, a first operational strategy referred to as "airport departure" strategy is described. In accordance with this operating principle, only transport units that are relevant source units D or full source units are transferred to a selected aisle by means of the transverse conveyance locations Q. Source or product units D are transport units that include articles that are selected to make up a particular order. The aisle is selected based upon minimization of the movement in the transverse conveyance locations Q between aisles and order utilization and distribution. In other words, for the purpose of picking/consolidation, the aisle selected is the one which permits minimization of the movement of the product units D for order processing and the order can be completed at one individual aisle or a single picking station P at which the transport units that are order units O are filled with all of the articles of an order from the corresponding product units D. The order units O can be transferred either from the picking station P back into the storage facility for temporary storage therein and consolidation, or can be transferred to a dispatch station for completion of the order by an external conveyor E which connects the picking stations. When consolidating full source units, full source units associated with the same order are stored in an aisle until the order awaits processing. Then, the source units are removed from storage consecutively from the aisle, wherein the specified sequence can be maintained for the most part.

Figure 5:
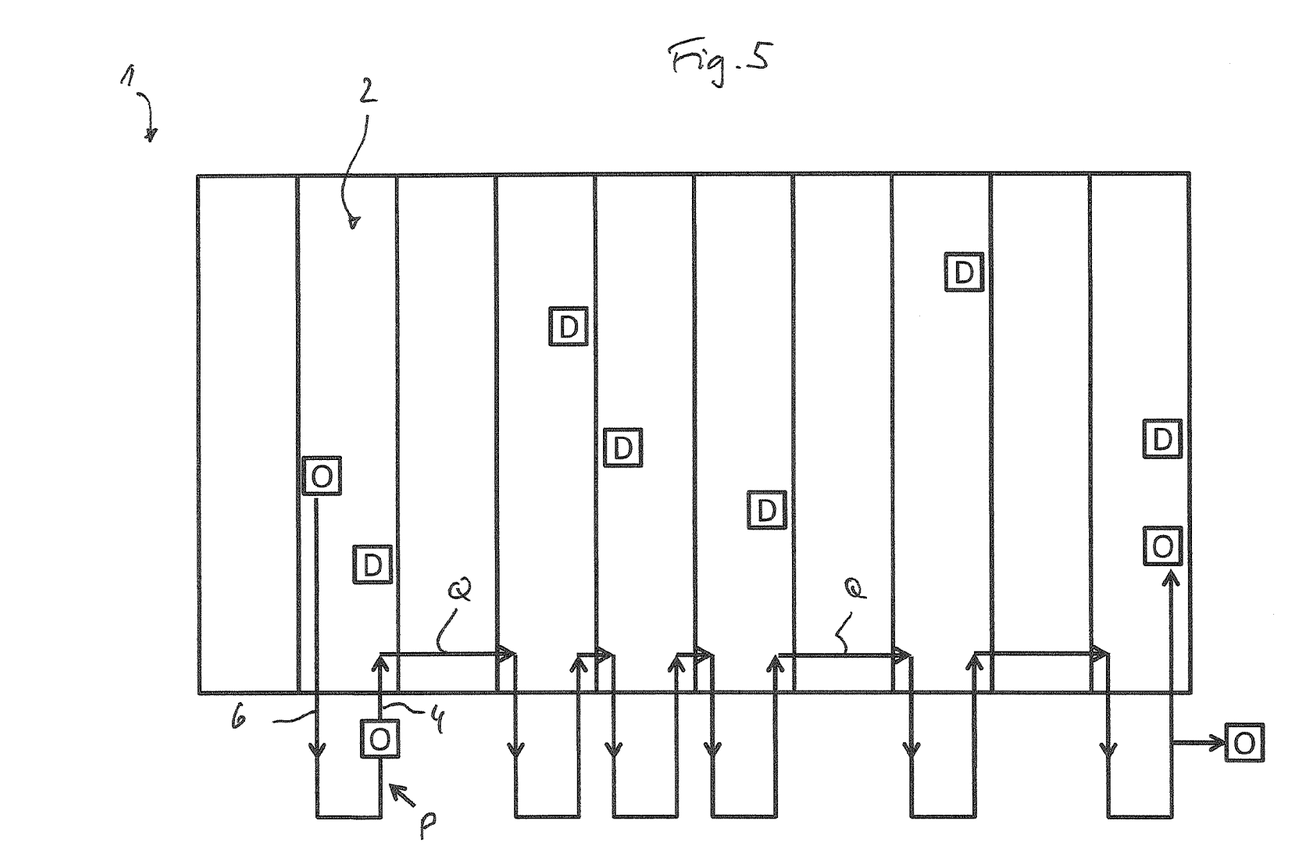
FIG. 5 shows a simplified and schematic view of the storage facility of FIG. 1 that is operated in accordance with a second principle.

In FIG. 5, a second operational strategy referred to as "limousines" strategy is described. In accordance with this mode of operation, only order units O are moved through the automated storage facility by means of the transverse conveyance locations Q. In other words, picking is performed at each relevant aisle, in which a relevant product source transport unit D is stored and the order units O "travel" through the aisles 2 to a plurality of picking stations P until the order is processed.

Figure 6:
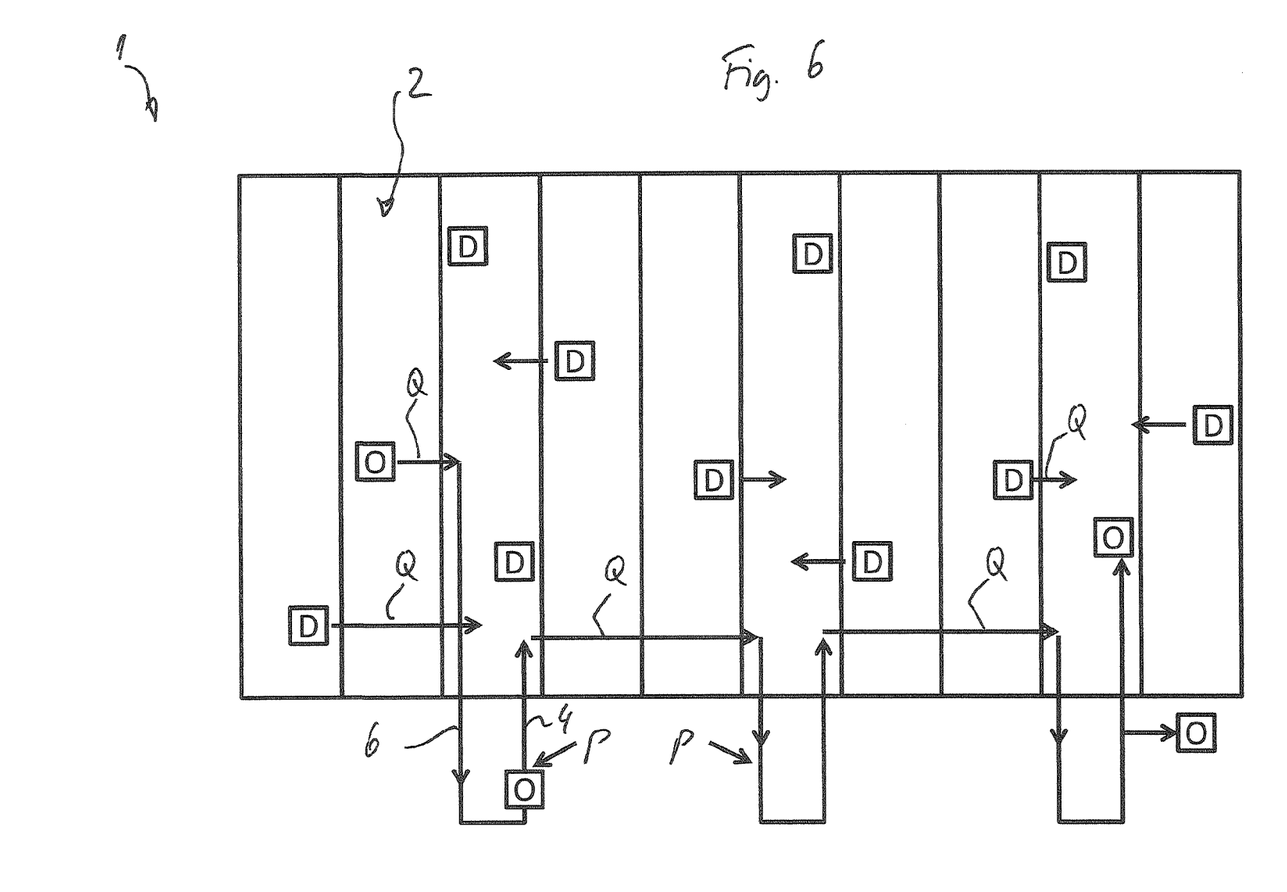
FIG. 6 shows a simplified and schematic view of the storage facility of FIG. 1 that is operated in accordance with a third principle.

In FIG. 6, a third operational strategy referred to as a "bus stops" strategy is described. In accordance with this operating strategy, order units O as well as product units D are transferred in the automated storage facility by means of the transverse conveyance locations Q. In other words, picking is performed at a small number of selected aisles 2, at which relevant product units D for an order are consolidated by means of the transverse conveyance locations Q and the order units O "travel" in the same manner via a plurality of aisles 2 to selected picking stations P until the order is fulfilled. Consolidation of the order units O and product units D is based upon optimization of the order utilization and distribution and optimum use of such mobile resources, such as, e.g., racking serving units, lifts, and the like.

Figure 7:
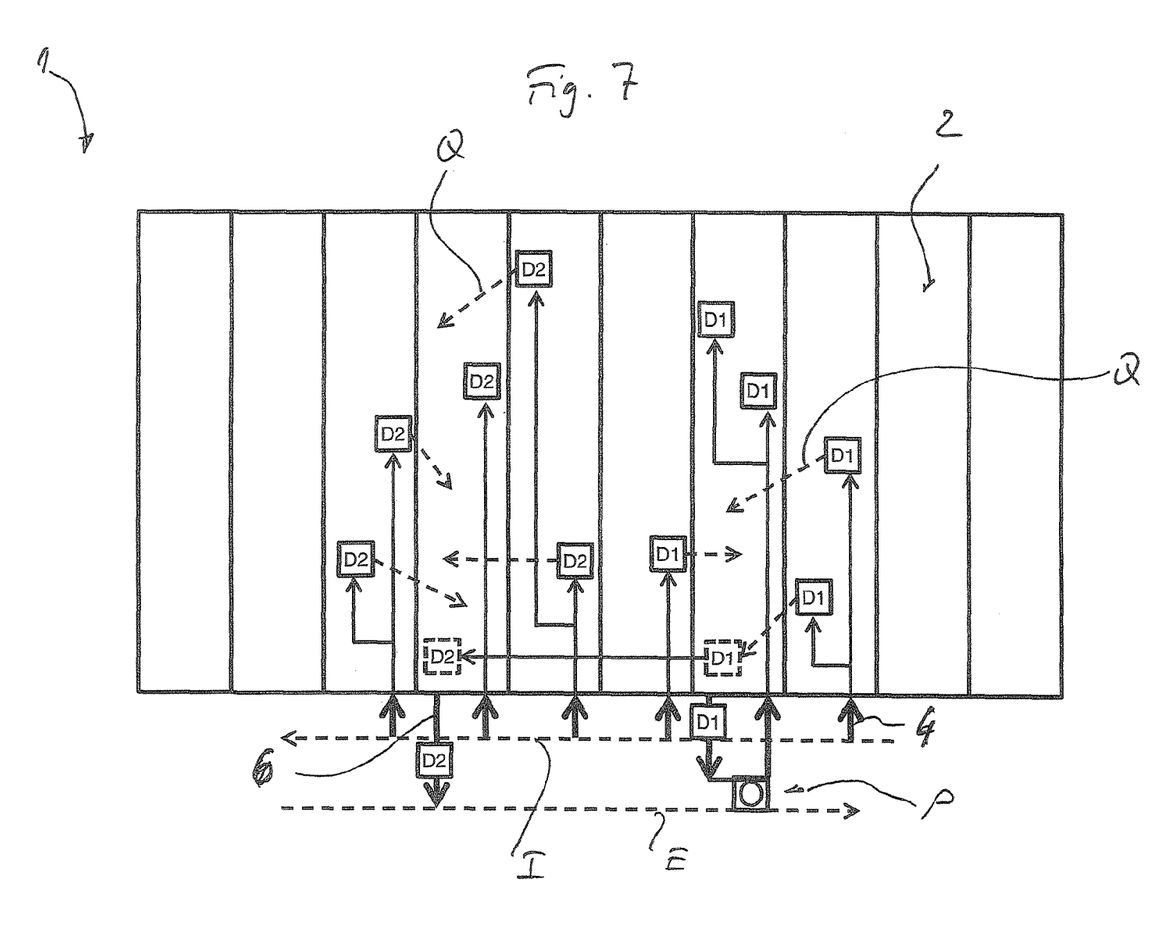
FIG. 7 shows a simplified and schematic view of the storage facility of FIG. 1 that is operated in accordance with a fourth principle.

In FIG. 7, a fourth operational strategy referred to as an "airport arrival" strategy is described. In accordance with this operating principle, source units, or full source units D which are incoming (to be placed into storage), are placed into storage in the automated storage facility directly into the particular aisle 2 or nearest possible aisle 2 which will be used or most likely be used for order processing, based upon the information available at the time of storage-entry, taking into account a minimization of the transverse displacement in the transverse conveyance locations Q. This information includes but is not limited to:

instantaneous product distribution or movement of each product in the storage facility;
    orders which are already associated with individual aisles;
    orders awaiting processing;
    summary of families or product categories.

Source units D1 which are to be placed into storage, associated with a first order, and source units D2 which are to be placed into storage, associated with a second order, are conveyed on an input conveyor I into the storage facility or the corresponding aisles 2, which is connected to the storage-entry feeding lines 4, based upon the above rules.

If an input conveyor I is not provided, the supply/inward transfer can also be conducted in a different way in accordance with the specification of the inventory management software, e.g. manually, by automated guided vehicles, depalletizers, etc.

Within the storage facility, the source units D are transferred by means of the transverse conveyance locations Q to the actual aisle 2 where picking then actually takes place, wherein, e.g., a source unit D1, after being used in one order, can subsequently become a source unit D2 to be used in a different order.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The invention claimed is:

1. Method for providing transport units from a storage facility wherein the storage facility includes a plurality of storage racks each having multiple storage rack levels, wherein interior storage racks are arranged in pairs adjoining one another and have an access aisle on at least one side of each pair, said storage facility further including at least one storage line and at least one removal line, a storage and removal vehicle for each access aisle and at least one lift that is adjoined by the at least one storage line and the at least one removal line, said method comprising:
selecting a specific aisle based upon minimization of the movement in the transverse conveyance locations between aisles, and
directly exchanging transport units between two adjoining storage racks from one access aisle to the specific access aisle via transverse conveyance locations in the storage racks, wherein the storage and removal vehicle comprises a shuttle at each level of the storage racks, wherein the directly exchanging comprises the shuttle acting on the transport units to displace the transport units by contact with the shuttle in the transverse conveyance locations from one of the adjoining racks to the other of the adjoining racks including transferring product transport units to the specific aisle using the transverse locations, the product transport units having articles to make up a particular order.

2. Method as claimed in claim 1 wherein the transverse conveyance locations are provided on each level of the storage racks.

3. Method as claimed in claim 2 including utilizing said transverse conveyance locations as temporary storage locations.

4. Method as claimed in claim 2 including exchanging the transport units bi-directionally at the transverse conveyance locations.

5. Method as claimed in claim 2 including exchanging the transport units uni-directionally at the transverse conveyance locations.

6. Method as claimed in claim 1 wherein the transverse conveyance locations are arranged centrally in the longitudinal direction of the rack.

7. Method as claimed in claim 6 including utilizing said transverse conveyance locations as temporary storage locations.

8. Method as claimed in claim 1 including utilizing said transverse conveyance locations as temporary storage locations.

9. Method as claimed in claim 1 including exchanging the transport units bi-directionally at the transverse conveyance locations.

10. Method as claimed in claim 9 including using the transverse conveyance locations as live storage rack locations for storage of transport units.

11. Method as claimed in claim 1 wherein the transverse conveyance locations have a low friction surface.

12. Method as claimed in claim 1 wherein the transverse conveyance locations are structurally reinforced.

13. Method as claimed in claim 1 wherein the shuttle places the transport units into storage at at least double depth in the transverse conveyance locations for exchange purposes.

14. Method as claimed in claim 1 wherein the shuttles are captive vehicles which are each limited to movement in a single aisle.

15. Method as claimed in claim 1 including a removal line for each storage access aisle.

16. Method as claimed in claim 1 including a storage line for each storage access aisle.

17. Method as claimed in claim 1 including a lift for each storage access aisle.

18. Method as claimed in claim 1 including a lift in selected storage access aisles.

19. Method as claimed in claim 1 wherein the transverse conveyance locations are arranged adjacent the at least one lift.

20. Method as claimed in claim 1 including exchanging the transport units uni-directionally at the transverse conveyance locations.

21. Method as claimed in claim 1 wherein the specific aisle is selected based upon the order being completed at that aisle or at a particular picking station.

22. Method as claimed in claim 21 wherein order transfer units are transferred from the picking station back into the storage facility or are transferred from the picking station by an external conveyor, wherein the order transfer units contain at least one order.

23. Method for providing transport units from a storage facility wherein the storage facility includes a plurality of storage racks each having multiple storage rack levels, wherein interior storage racks are arranged in pairs adjoining one another and have an access aisle on at least one side of each pair, said storage facility further including at least one storage line and at least one removal line, a storage and removal vehicle for each access aisle and at least one lift that is adjoined by the at least one storage line and the at least one removal line, said method comprising:
selecting a specific aisle based upon minimization of the movement in the transverse conveyance locations between aisles, and
directly exchanging transport units between two adjoining storage racks from one access aisle to the specific access aisle via transverse conveyance locations in the storage racks, wherein the storage and removal vehicle comprises a shuttle at each level of the storage racks, each shuttle having a platform for supporting transport units and telescopic arms which extend into the storage racks to push transport units off the platform and pull transport units onto the platform and wherein said directly exchanging transport units comprises pushing the transport units with the telescopic arms in the transverse conveyance locations from one of the adjoining storage racks to the other of the adjoining storage racks including transferring product transport units to the specific aisle using the transverse locations, the product transport units having articles to make up a particular order.

24. Method as claimed in claim 23 wherein said telescoping arms push transport units off the platform to at least one storage row to store the transport units and pull transport units from the at least one storage row to retrieve transport units and wherein said directly exchanging transport units comprises pushing the transport units with the telescopic arms in the transverse conveyance locations beyond the at least one storage row to exchange the transport unit with an adjoining storage rack.

25. Method as claimed in claim 24 including fingers on the telescopic arms to pull transport units from the at least one storage row and wherein said pushing the transport units with the telescoping arms comprises pushing the transport units in the transverse conveyance locations with said fingers to exchange the transport unit with an adjoining storage rack.

26. Method as claimed in claim 23 storing transport units to and retrieving transport units from at least two double rows of transport units on said racks.

27. Method as claimed in claim 23 wherein said pushing the transport units with the telescopic arms comprises extending said telescopic arms on both sides of the access aisle to racks on opposite sides of the access aisle.

28. Method as claimed in claim 23 wherein the specific aisle is selected based upon the order being completed at that aisle or at a particular picking station.

29. Method as claimed in claim 28 wherein order transfer units are transferred from the picking station back into the storage facility or are transferred from the picking station by an external conveyor, wherein the order transfer units contain at least one order.

* * * * *

UNITED STATES PATENT AND TRADEMARK OFFICE
CERTIFICATE OF CORRECTION

PATENT NO. : 9,452,886 B2  
APPLICATION NO. : 14/342468  
DATED : September 27, 2016  
INVENTOR(S) : Shin Yamashita

Page 1 of 1

It is certified that error appears in the above-identified patent and that said Letters Patent is hereby corrected as shown below:

In the Claims

Column 11  
Line 1, Claim 26, Insert --including-- after "claim 23"

Signed and Sealed this  
Seventh Day of March, 2017

Michelle K. Lee  
*Director of the United States Patent and Trademark Office*